United States Patent [19]
Toman

[11] 4,080,600
[45] Mar. 21, 1978

[54] SCANNING BEAM RADIO NAVIGATION METHOD AND APPARATUS

[75] Inventor: Donald J. Toman, Pleasantville, N.Y.

[73] Assignee: Tull Aviation Corporation, Armonk, N.Y.

[21] Appl. No.: 747,244

[22] Filed: Dec. 3, 1976

Related U.S. Application Data

[63] Continuation-in-part of Ser. No. 688,159, May 20, 1976, abandoned.

[51] Int. Cl.² .................. G01S 1/54; G01S 1/38
[52] U.S. Cl. .................. 343/106 R; 343/106 D; 343/108 M
[58] Field of Search .......... 343/106 R, 106 D, 108 M

[56] References Cited

U.S. PATENT DOCUMENTS

| | | | |
|---|---|---|---|
| 2,112,283 | 3/1938 | Fritz | 343/106 R |
| 2,257,320 | 9/1941 | Williams | 343/106 R |
| 2,977,592 | 3/1961 | Bruck | 343/106 R X |
| 3,757,337 | 9/1973 | Litchford | 343/106 R |
| 3,818,478 | 6/1974 | Groginsky | 343/106 R |

Primary Examiner—Maynard R. Wilbur
Assistant Examiner—Richard E. Berger
Attorney, Agent, or Firm—Curtis Ailes

[57] ABSTRACT

High accuracy guidance signals are produced over a wide angle by sequencing in a predetermined sequence through a series of narrow angular sectors while electrically scanning the transmitted signals within each sector.

31 Claims, 8 Drawing Figures

SCANNING BEAM RADIO NAVIGATION METHOD AND APPARATUS

This is a continuation-in-part of U.S. patent application Ser. No. 688,159 filed May 20, 1976 for COMBINED MECHANICAL AND ELECTRICAL SCANNING BEAM RADIO NAVIGATION METHOD AND APPARATUS; now abandoned.

BACKGROUND OF THE INVENTION

This invention relates to radio navigation systems employing directional radio signals, and more particularly to radio guidance systems which are especially useful for aircraft.

In radio navigation systems for providing guidance signals, it is common to provide guidance signals which simply define a desired approach direction to a landing runway. However it is very desirable to provide precise directional "bearing" and glide path elevation information to an aircraft approaching an airport from any direction which gives the aircraft its precise angle of approach to a ground based transmitter at the airport. For azimuth, this requires 360° azimuth signal coverage. Providing 360° azimuth coverage with a high accuracy of signal resolution usually presents formidable problems, including potentially high cost and elaborate antenna structures.

Accordingly, it is one object of the present invention to provide a very accurate guidance signal which is available over a wide angle, and which may encompass the entire 360° of azimuth with a high resolution and with a simple and very economical structure.

Furthermore, providing wide angle azimuth coverage in a dependable and reliable manner is also complicated by difficulties in monitoring the signals produced by the system in order to be certain that accuracy is maintained within required limits.

Accordingly, it is another object of the invention to provide a system for wide angle azimuth radio guidance which is very simply and economically monitored.

Further objects and advantages of the invention will be apparent from the following description and the accompanying drawings.

The invention is carried out by a method of providing accurate azimuth orientation information to an aircraft in any azimuth angle position over a wide angle sector with respect to a ground station comprising mechanically rotating about a vertical axis a ground station transmitter antenna array which is capable of producing directional radio guidance signals by an electrical scan through only a limited azimuth angle sector for each rotational position thereof, transmitting radio guidance signals from the antenna array in a sequence of separate electrically scanned sector signals during successive mechanical rotation through a plurality of separate rotational positions, and transmitting radio signals in conjunction with each of said electrically scanned sector signals to uniquely identify the rotational position of said antenna array, corresponding to a particular sector, the number of said separate rotational positions at which electrically scanned sector signals are emitted being sufficient to cover all azimuth angles within said wide angle sector by the combination of all of the separate electrically scanned sector signals.

Figure 1:
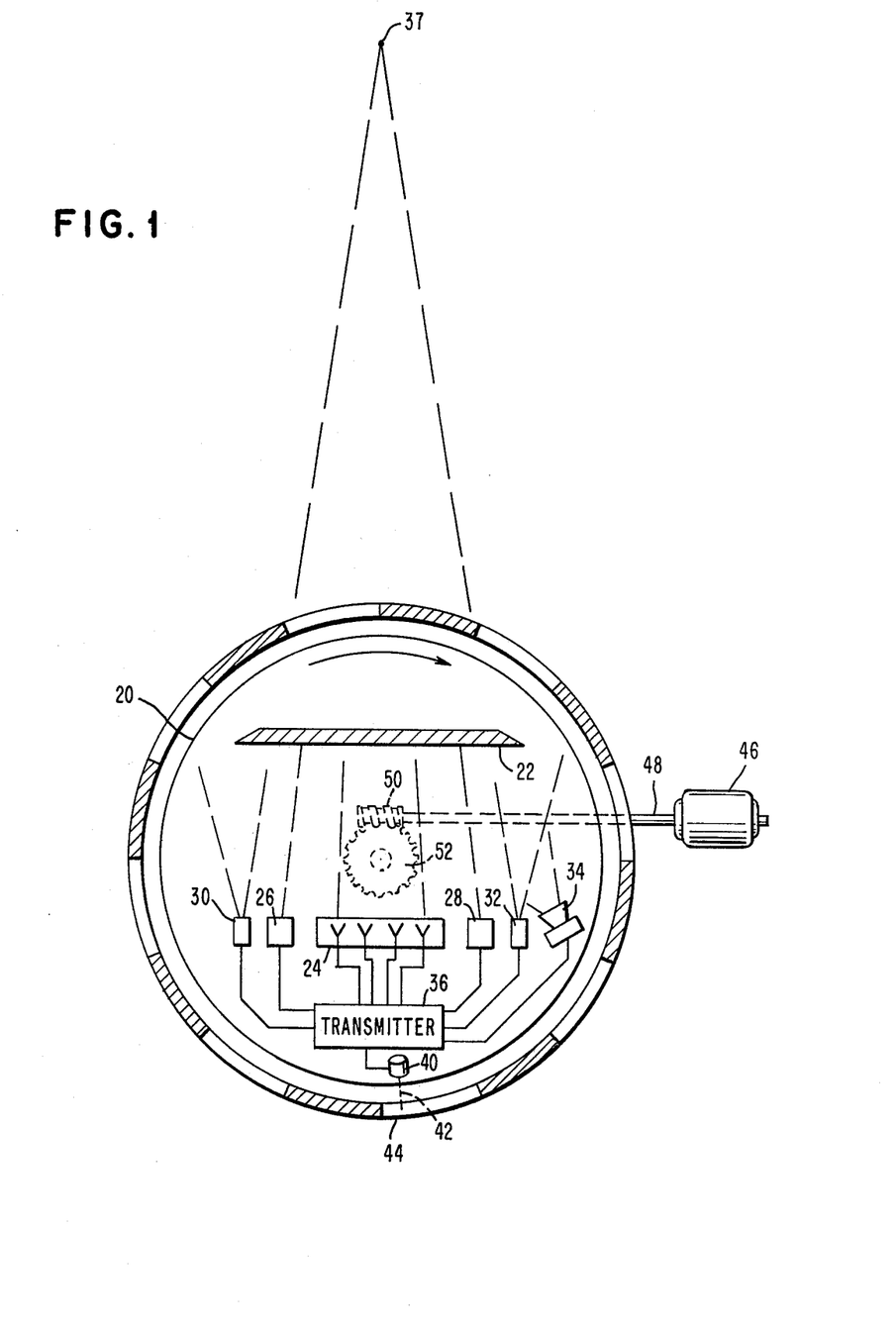
FIG. 1 is a schematic top view of a transmitter with an associated antenna arrangement mounted upon a rotatable platform for carrying out the present invention.

Referring more particularly to FIG. 1 there is illustrated a narrow sector scanning beam antenna array mounted for rotation upon a platform indicated at 20. By mechanically rotating this narrow sector antenna array and electrically scanning individual sectors during mechanical rotation the entire 360° azimuth range is effectively covered by the combination of the signals of all of the individual sector scans.

The antenna array includes a reflector 22 which is a sector of a horizontally aligned cylinder for shaping the beams in elevation and a plurality of antenna elements directing beams to the reflector 22 for subsequent reflection and use by aircraft receivers. The antenna elements may include a phased array 24 for producing a beam which is phase scanned in azimuth, clearance elements 26 and 28 for providing clearance signals, side lobe suppression elements 30 and 32, and a sector omni horn radiator 34. These elements are all connected to receive signals from a transmitter 36.

Because of the geometry of the antenna structure, the apparent center of radiation of the phase scanned beam is at a point 37 behind the reflector 22 and offset from the center of rotation of platform 20. This is significant and is referred to more fully below.

As the entire array is rotated to cover different sectors, the sector omni horn 34 emits a signal for each sector which identifies that sector to the receiver and which may time-share the same carrier signal used for the navigation signals.

In a preferred signal format the signals emitted from the sector omni horn 34 are digitally coded by simply keying the carrier by phase reversals to provide a group of binary digital bits identifying the 360° azimuth function and also identifying which sector the antenna platform 20 and the antenna array has been mechanically rotated to. The entire 360° azimuth is preferably divided into a number of predetermined sectors. The sector identification is preferably a coded representation of the particular sector which must be decoded by the receiver.

The data just mentioned above is followed by the navigational signal information which may be transmitted preferably by a simple to and fro scanning beam arrangement in which the aircraft receiver determines its position by measuring the time interval between successive receptions of the scanning beam on the to and fro scans. This system of scanning is disclosed for instance in connection with FIG. 7 of U.S. Pat. No. 3,757,337 issued Sept. 4, 1973 on an invention by George Lichford entitled "Aircraft Instrument Landing System." The signal format described above (including the to and fro scan) has been proposed for use in a new microwave landing system which is presently under development by the United States Federal Aviation Administration of the Department of Transportation. The proposed new system is described in various publications, including a report dated December 1975 entitled "Time Reference Scanning Beam Microwave Landing System" issued by the U.S. Department of Transportation, Federal Aviation Administration and submitted to the International Civil Aviation Organization. This report is hereinafter referred to simply as the "FAA report". Details of the present system are preferably carried out in accordance with the teachings of the FAA report.

In the present invention, in order to provide to and fro scans of substantially equal net velocity, the electronic scanning speed in the "fro" direction opposite to the direction of mechanical rotation, is increased to compensate for the subtraction in scan velocity due to the mechanical rotation. By this means, the net rotational scan rates in the two directions (the "to" direction in which the mechanical rotation adds to the electrical scan, and the "fro" direction in which the mechanical rotation subtracts from the electrical scan) are made to be equal, and thus no error is introduced into the to and fro scan information. Rotational position compensation is also introduced to compensate for the difference in rotational position of the antenna array from the beginning of the "TO" scan to the beginning of the "FRO" scan. The signals are then directly analogous to those which would have been emitted from a stationary electrical sector scan antenna which scans electrically at equal speeds in the to and fro directions.

By designing the sector scan antenna (FIG. 1) for a limited scan angle such as, for instance, plus or minus 16° (a total of 32° in azimuth), the antenna design may economically produce high resolution signals. The scanning beam is preferably quite narrow in azimuth, being in the order of 3° wide.

With a 32° scan, it is practical to cover the entire 360° azimuth range with a total of sixteen 22.5° sectors. These scan sectors are indicated schematically in FIG. 2 of the accompanying drawings and respectively numbered 1-16. The entire group of signals for a particular sector scan, is sometimes referred to hereinafter as simply a "sector signal", or a radio guidance signal. This entire group of signals may also be referred to as carrying a "set of guidance information" for a particular sector. As explained more fully below, the sector signal from the transmitter enables an aircraft receiver to determine the true bearing of the aircraft based upon the resultant received signal (set of signal information).

Figure 2:
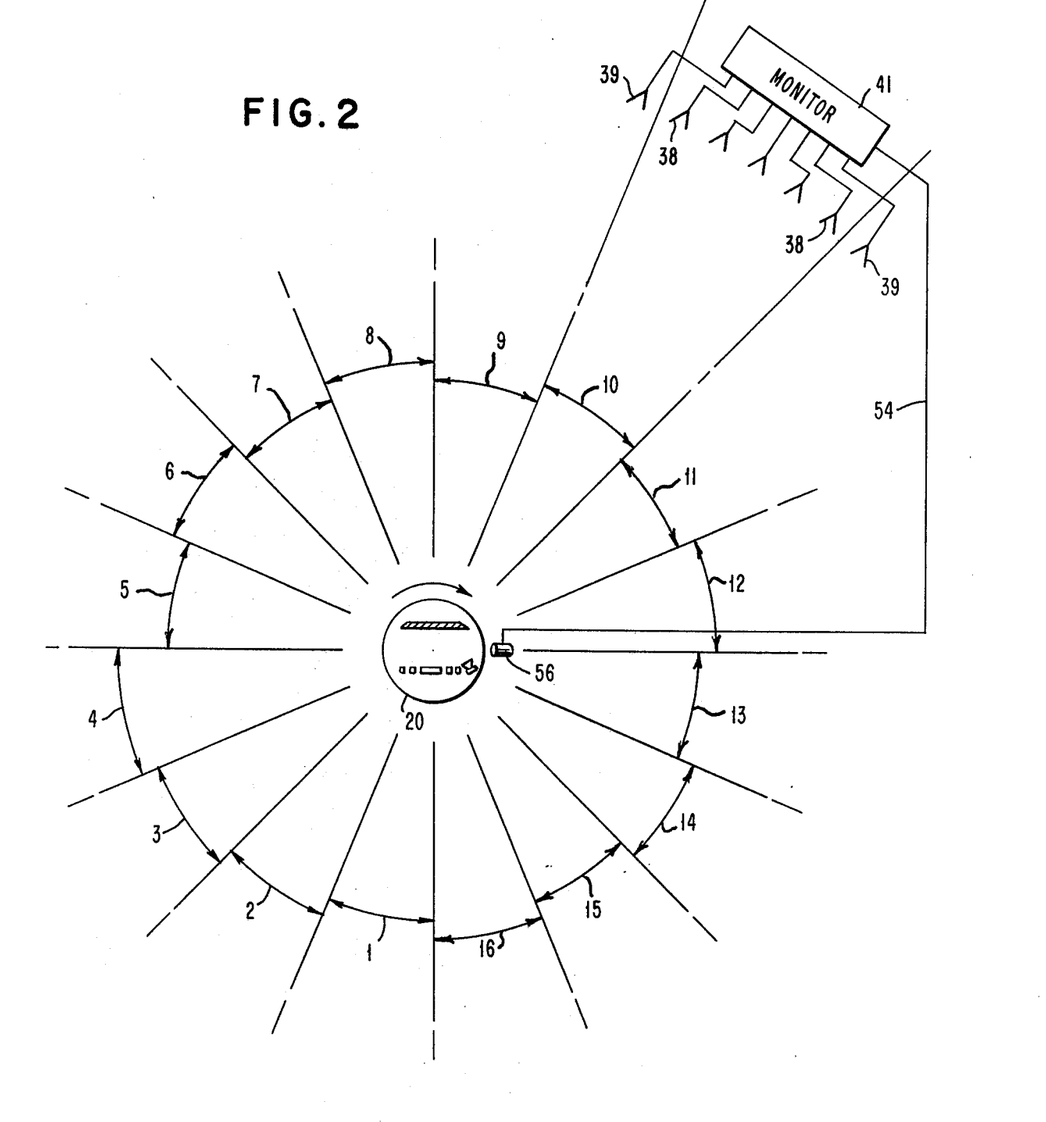
FIG. 2 is a reduced scale representation of the apparatus of FIG. 1 showing the individual sectors electrically scanned by the apparatus and illustrating the arrangement of a monitor for the apparatus.

In the field of one of the sectors 10 there is provided a monitor 41 including a plurality of monitor antennas 38 arranged to pick up the signals at various angles within that sector. By monitoring the scanning beam within the single sector 10 on every mechanical revolution of the antenna array, substantially continuous monitoring of the operation of the system is accomplished in a very simple manner. Since each sector scan overlaps the boundaries of its sector into the adjacent sectors, provision is made for monitoring outside the boundaries of sector 10 by means of monitor antennas 39.

The correct sector position signal emitted by the horn 34 for each individual sector is preferably obtained by means of a switching device which detects the rotational position of the antenna platform 20.

This switching device is illustrated as a photoelectric pickup 40 in FIG. 1 which is electrically connected to the transmitter 36 and mechanically mounted for rotation upon the platform 20. As schematically indicated at 42, the photoelectric pickup 40 is arranged to pick up optical signals from a stationary non-rotating optical track 44. Track 44 has alternating light and dark sectors corresponding to the sectors 1-16. Accordingly, as the platform 20 rotates, the photoelectric pickup cell 40 indicates, by a transition between a light and a dark sector of track 44, whenever a new sector is entered.

The track 44 and optical pickup 40 are shown schematically in FIG. 1 at the periphery of the platform in order to illustrate the principles of operation in a simple plan view. For dependable operation, a light source would be required in conjunction with this optical pickup device, but is not shown. Furthermore, the optical track 44 and the optical pickup device 40 are preferably arranged beneath the platform 20, rather than around the periphery of the platform, as schematically shown in the drawing.

It is an important advantage that the sector omni horn 34 only needs to cover the sector currently in use, with a much lower total power input than would be required with a unitary (non-sectorized) 360° scan having a 360° omni signal radiator.

The platform 20 is driven by an electric motor indicated at 46 through a drive shaft schematically indicated at 48, a worm gear indicated at 50, and a cooperating worm wheel 52 which is attached to the underside of the platform 20. Preferably, the drive motor 46 is a constant speed motor, such as an alternating current synchronous motor. With such an arrangement, it is preferred that the signals provided by the photoelectric pickup device 40 and the photo optical track 44 in response to rotation of the platform 20 are used as the clock signals for the system. Thus, the entire system functions in synchronism with the mechanical rotation of the platform 20. Where the 360° azimuth function time-shares the use of the same radio carrier frequency with other navigation signal functions, the time intervals used by all of the functions are clocked to be in synchronism with the rotation of the platform 10.

Alternatively, if it is not convenient to synchronize the entire system in response to rotation of the platform, a variable speed motor is used for motor 46, and the motor speed is continuously adjusted in order to synchronize the rotation of the platform with the timing clock of the system.

While fixed predetermined angular sectors are preferred, it is also possible to employ additional optical pickups, such as pickup 40, and additional optical tracks such as track 44 to provide digitally coded indications of the exact angles of rotation of the platform 20 (within the resolution provided by the smallest subdivisions on the optical tracks) and to operate the system without fixed sectors, determining the sectors on the basis of control by the system clock, rather than on the basis of the position of platform 20. However, the fixed angle sectors are preferred because of the resultant simplification of the system, and particularly of the receiver.

While various speeds of operation are possible, it is proposed to have as many as three complete 360° azimuth coverages per second. This requires a mechanical rotational speed of 180 revolutions per minute for the platform 20. For applications where a lower data rate is permissible, the mechanical speed can be correspondingly decreased.

With the above mentioned mechanical rotational speed of 180 revolutions per minute, and typical sector scan cycle times for the individual sector scans having a total interval of about 11⅝ milliseconds (consistent with the proposed back azimuth function timing in the above mentioned FAA report), the "dead" time interval between individual sector scans is approximately 91/6 milliseconds. Thus, these "dead" time intervals may be employed for other navigation functions, such as elevation for instance. If desired, more frequent sector scans may be provided on some sectors than on others where some sectors are more important because they serve a particular runway. This can be done by increasing the platform speed, reducing the dead time between scans, and then scanning the most important sectors on every rotation, and scanning the other sectors only on every other rotation of the platform.

The monitor 41 is preferably provided with a signal or signals, on a connection indicated at 54 in FIG. 2 indicating when the platform 20 has been rotated into position to transmit signals into the sector or sectors being monitored. This sector signal may preferably be provided by means of a photoelectric pickup 56 which can pick up optical signals reflected from a track (not shown) which rotates with the platform, having sectors of different colors or different reflectivity. Each of the monitor antennas 38 and 39 may operate a separate receiver channel within the monitor 41 following along the lines of the receiver described below in connection with FIGS. 3 and 4. For reasons of economy, adequate monitoring may be obtained by employing a single receiver channel within the monitor 41, and successively switching that receiver to the different antennas 38 and 39 to monitor scans on successive rotations of the platform 20.

Figure 3:
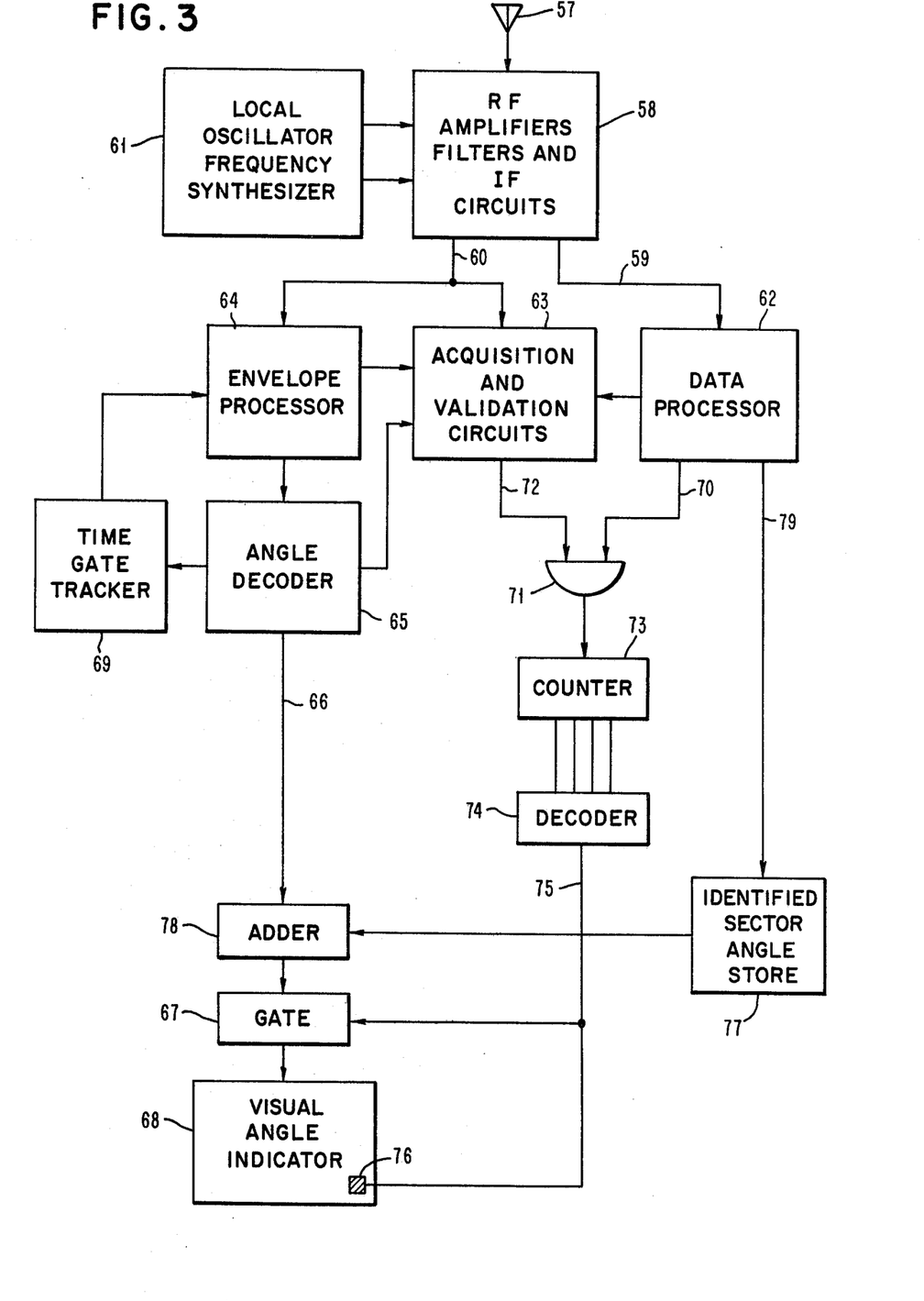
FIG. 3 is a schematic representation of an aircraft receiver for receiving and processing signals from the ground station of FIGS. 1 and 2.
Figures 4, 4A:
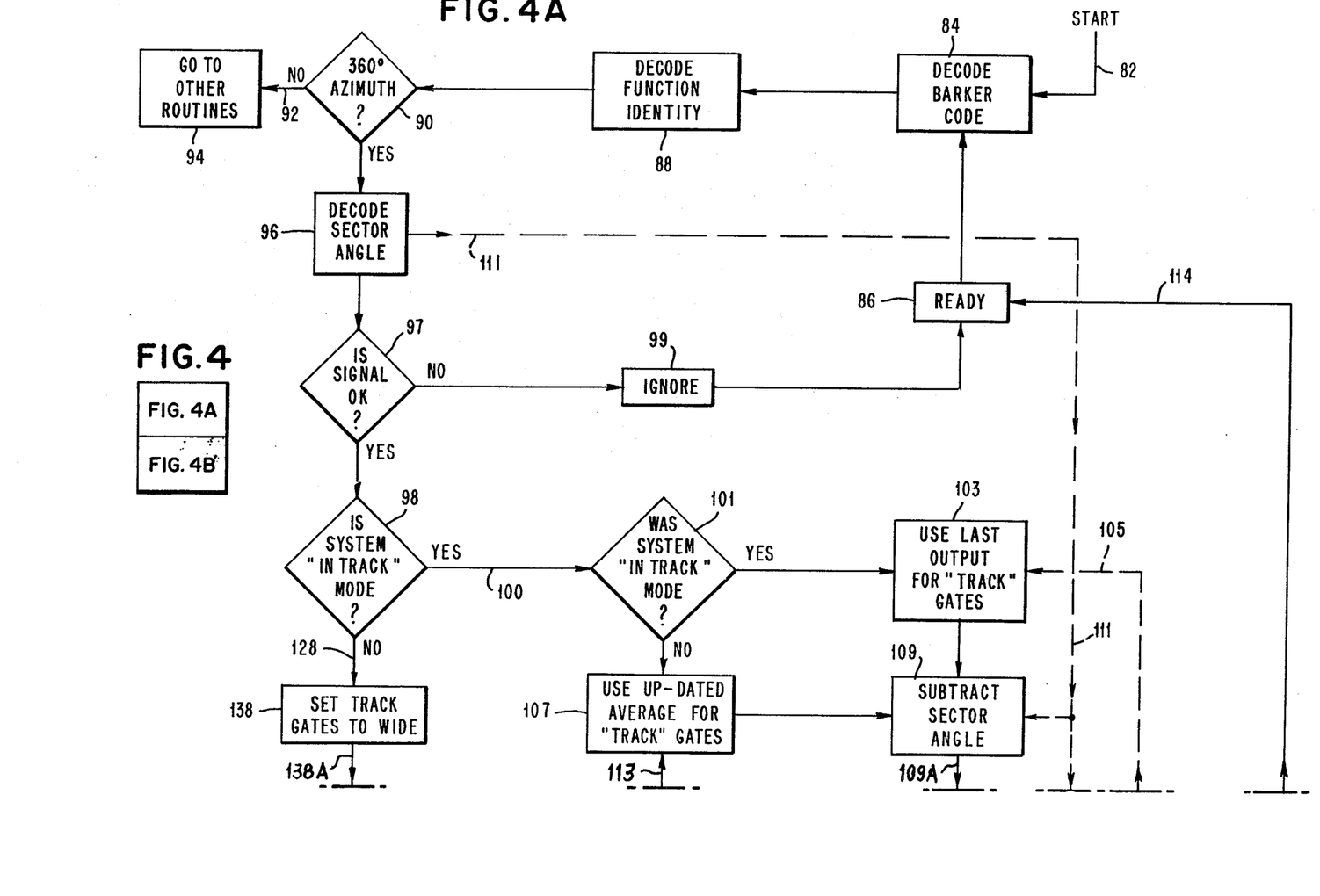
FIGS. 4A and 4B together form a flow chart, sometimes referred to collectively as FIG. 4, illustrating the logical sequence of steps in the operation of the receiver of FIG. 3.

A receiver which is suitable for incorporation with the present invention is illustrated schematically in FIG. 3, and a flow chart illustrating the operation of the receiver, in greater detail, is illustrated in FIG. 4.

The construction of the receiver, in many basic respects, conforms with the receiver proposed in the FAA report.

Referring more specifically to the receiver as illustrated in FIG. 3, the receiver includes an antenna schematically shown at 57 which receives the scanning beam signals, which are transmitted preferably at C-band microwave frequencies. Antenna 57 supplies those signals to the early stages of the receiver indicated at 58, which include radio frequency amplifiers, filters, and intermediate frequency circuits. These circuits amplify the received signal, filter out unwanted adjacent signals, and convert the microwave signal to an intermediate frequency signal at connection 59, and a "video" signal at 60. A local oscillator frequency synthesizer is provided, as indicated at 61, which supplies suitable local oscillator frequencies to the mixers within 58 for accomplishing the frequency conversions.

The intermediate frequency signal on connection 59 is supplied to a data processor circuit 62 which detects and decodes the digital parts of the signals, usually consisting of the digital preamble to each set of navigation signals.

The video signal is supplied on connection 60 to the acquisition and validation circuits 63 and to the envelope processor 64. The acquisition and validation circuits 63 assess the quality of the navigation signal and thereby determine whether or not the resulting data is to be displayed and used. The envelope processor 64 precisely determines when the "to" and "fro" beams scan by the aircraft. The resultant signals are supplied to an angle decoder 65 which determines azimuth angle based upon the time interval between the "to" and "fro" scans. Such angle determination signals appear at the output 66, and are ultimately gated, such as through the gate 67 to indicators or angle data utilization devices, such as the navigation azimuth angle indicator shown at 68.

The time gate tracker circuit 69, which is connected between the angle decoder 65 and the envelope processor 64 designates which of the "to" and "fro" scans are to be processed.

All of the circuits of FIG. 3 described above are preferably used in common for a number of different navigation information signal functions, in addition to those of the present invention.

When a 360° azimuth function scan group of "to" and "fro" scans is detected by the data processor 62 by means of the digital data preamble accompanying those scans, a resultant signal appears at the data processor output connection 70 to a logic AND gate 71. When the acquisition and validation circuits 63 determine that all of the other conditions necessary for valid reception of data exist on a particular data cycle, an output signal appears on connection 72, providing a second input to the AND gate 71, causing the delivery of a signal from that AND gate to a counter 73. The data cycles are repeated in a sequence, over and over, and include interspersed data scans for different functions. However, an entire series of data cycles is repeated with considerable rapidity, with one or more localizer scans included in each series. The reliability of the data is checked a number of times, on a number of separate localizer scan cycles so as to increment the count stored in the counter 73 up to a level above a predetermined count, before the guidance information is actually needed. When that count, or any count above that level, is achieved, it is detected by a decoder 74 which provides an output at connection 75. The resultant output signal at connection 75 operates visible flag device 76 which forms a part of the navigation indicator 68 and tells the pilot of the aircraft that true data is available. The signal on connection 75 from the detector 74 is also supplied to open the gate 67 to allow the navigation information from the angle decoder 66 to be supplied to the indicator 68.

If the aircraft is too far away from the ground station to receive navigation signals of sufficient strength, the acquisition and validation circuits will not increment the counter 73, and the flag 76 will not be operated so that the pilot wil know that he does not have reliable navigation information. When "operated", the flag is preferably withdrawn from view. Thus, if the flag is not operated, it is visible to the pilot. If the signals are marginal, and fading in and out, so that the counter 73 is incremented occasionally, but not consistently, the counter 73 will never reach the required count because the counter 73 is automatically counted down from time to time to keep marginal signals, which are only occasionally validated, from being used.

The data processor 62 not only determines the presence of the 360° azimuth function, it also identifies, from the preamble, which sector of the 16 sectors the particular signals are coming from. This information is available from the data processor 62 on a connection 79 and is effective to store an angle which is characteristic of the identified sector in a storage device indicated at 77. Preferably, this characteristic sector angle is a representation of the center line of the identified sector in terms of a true bearing. Since the output angle information at indicator 68 provides 360° azimuth information, the indicator also preferably indicates the azimuth bearing in the form of a true bearing related to North. Thus, North is zero, East is 90°, South is 180°, West is 270°, etc. Since the navigation angle information at connection 66 from the angle decoder 65 is only an indicator of an angle within the identified sector, (sometimes referred to hereinafter as the "scan angle") the output must be added in the adder 78, with the characteristic identified sector angle from store 77 in order to provide a true bearing required for indicator 68.

Figure 4B:
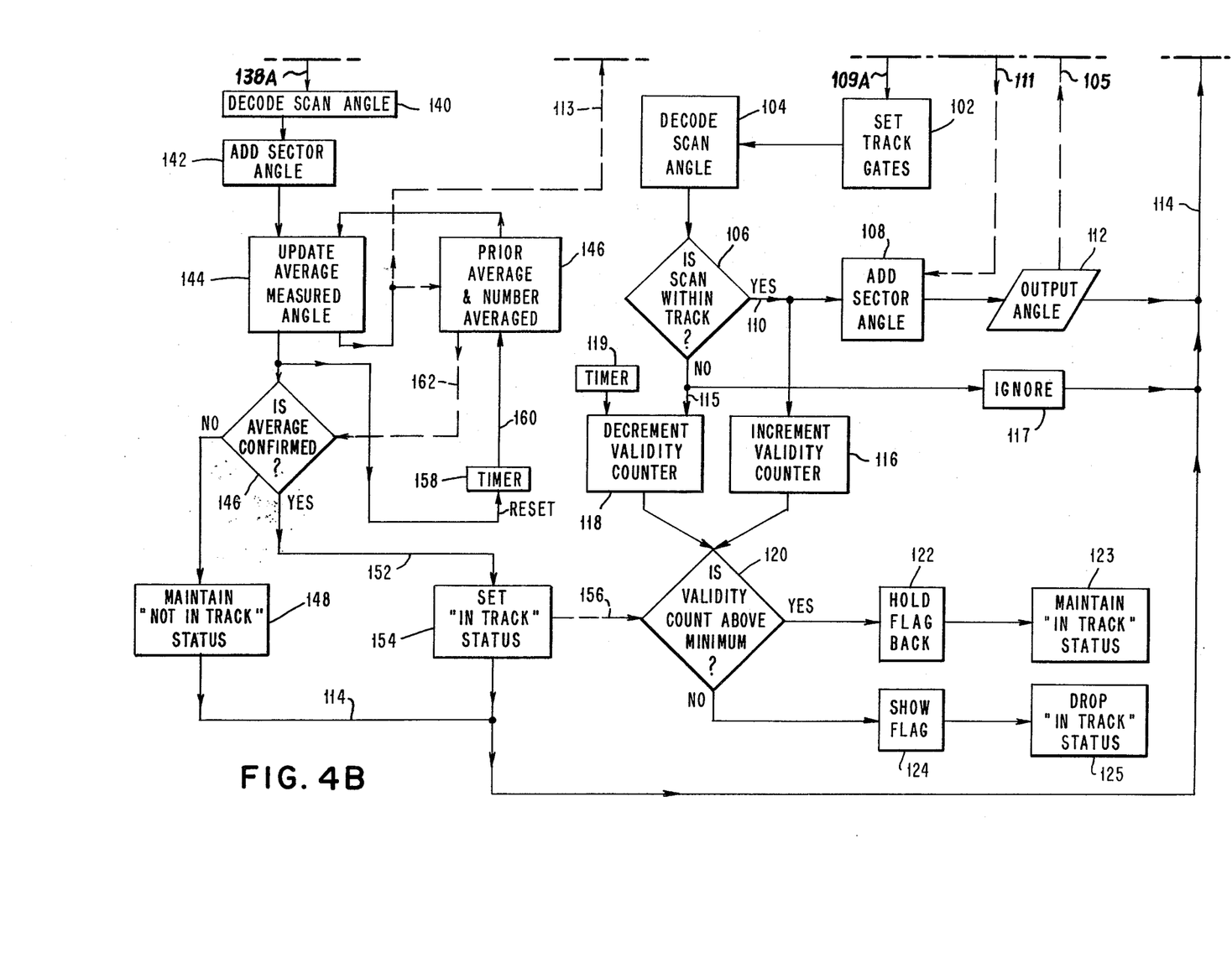

The receiver is actually much more complicated than indicated by the preceding description related to FIG. 3. It is believed that the details of the receiver are most easily comprehended by presentation of the functions of the receiver in a flow chart. Accordingly, FIG. 4 is presented as a flow chart indicating the details of the receiver operation. FIG. 4, as used below, refers collectively to FIG. 4A and FIG. 4B combined as shown in the drawing labeled FIG. 4.

FIG. 4 is a flow chart illustrating the functional logic operation of the aircraft receiver in receiving and processing the signals transmitted from the ground station as represented by FIGS. 1 and 2. The incoming information at 82 in the upper right hand corner of the diagram, representing a single set of signals, first has a digital preamble, which begins with a "Barker" code, decoded at 84, in the presence of a "ready" condition as indicated at 86. The decoded preamble information is then checked for the function identification at 88, and that information is checked at 90 to determine whether or not the set of information relates to the 360° azimuth function. If not, as signified by branch 92, other subroutines are followed relating to other signal functions as indicated at 94. If the 360° azimuth function is positively identified, then the sector angle information is decoded, as indicated at 96, to determine which of the sixteen sectors the signal information came from.

Next, the signal is tested, as indicated at 97, to determine if it is acceptable, that is, to determine whether it is stronger than the side lobe suppression signals and the clearance pulses. The side lobe suppression signals are strong enough in all of the other fourteen or fifteen sectors to cause a rejection, at this point of all signals except those for the sector or sectors at which the receiver is located. If the answer is "No" (rejection), the signal is to be ignored, as indicated at 99, and not processed further. Accordingly, "ready" information is sent back as indicated by the connection to 86. On the other hand, if the answer is "Yes", the next processing of the information is determined at 98 based upon whether or not it has previously been determined that the entire receiver is operating within an "in track" mode, meaning that it has been determined, as further explained below, that a sequence of consistent valid signals has been received. If the receiver is "in track", the next test is, as indicated at 101, to determine if the system was in "track" mode during the processing of the last previous signal. If the answer is "yes", the last previous output angle information is to be used for setting the track gates, as indicated at 103. The supplying of that angle information is indicated by the dotted line 105 from the output box 112 described further below. The last output angle information is in the form of an absolute corrected relative bearing of the receiver with relation to the transmitter. Next, as indicated at 109, the sector angle is subtracted from the angle value which is to be used to set the track gates. The sector angle information is supplied, as indicated by the dotted line 111, from the decoded sector angle as determined at the previously described step 96. The resultant remainder represents the expected scan angle within the sector being scanned. Next, the remainder angle is used, as indicated at 102, to set the track gates.

However, going back to box 101, if the system was not in the "track" mode during processing of the last previous signal, then there will be no valid output angle at 112. Accordingly, as indicated at 107, an updated average of previously taken tentative angle measurements is to be used to set the track gates. This average value is available, as indicated by the dotted line input at 113 from an average measured angle determination as indicated by box 144, to be described more fully below. The updated average angle used at 107 is also in the form of an absolute corrected compass bearing, and the sector angle is also subtracted from this heading, at 109.

After the track gates are set at 102, either on the basis of the last output, or on the basis of the updated average, the scan angle is decoded, as indicated at 104, to determine the actual scan angle within the designated sector. Then a test is made at 106 to determine whether the scan is within "track", based upon whether or not the scan is within the preset tracking gate limits. The tracking gates are set on the basis of the scan angle within the sector scan range. While out of sector signals are rejected at 97, the tracking gates provide another discrimination function, for these gates cannot be set outside the normal sector scan range.

If the result is "Yes", at branch 110 the sector angle is added to the scan angle at 108 and the result is supplied as the output angle information at 112 for indication of the bearing of the aircraft relative to the ground station to the operator of the aricraft. This also results in "ready" information provided at connection 114 to again ready the system at 86 for processing of new information.

It is one of the most important features of the invention that because of the logic set forth above, the system is capable of dealing accurately with successive sets of scanning information which may be derived from scans from different sectors. This follows from the fact that the output angle information available at 112 is in the form of an absolute compass bearing related to a single reference direction, such as north, and that output is used at 103 as the data for setting the track gates after subtracting the unique sector location angle for the sector within which the current scan occurs (at 109). Thus, the track gates are set, at 102, at limits indicative of where the sector scan should appear in relation to the center of the currently scanned sector, even though the currently scanned sector may be different from the previously scanned sector which established the output angle information available at 112. Thus, the aircraft carrying the receiver can fly from one sector to another, without losing "track", and while maintaining up-to-date, and constantly updated, angle-bearing information.

Referring back again to box 106, the indication of a valid scan within track at connection 110 also serves, as indicated at 116, to reinforce the information that the receiver is "in track" by incrementing a validity counter. On the other hand, if it is determined that the scan is not within track, at 115, then the validity counter is decremented, as indicated at 118. Also, the signal is ignored, as indicated at 117 and ready information is sent back, as indicated at 114 to ready block 86.

A determination is then made as to whether the validity count is greater than the minimum, as indicated at 120. If the answer is "Yes", an indicator flag is held back, indicating to the operator that valid signals are being received, as signified at 122. Also, the receiver is maintained in the "in track" status, as signified by box 123. If the answer is "No", then the indicator flag is shown, as signified at 124. Also, as signified at box 125, the receiver system drops the "in track" status. From the above, it is evident that the indicator flag, which is visible to the aircraft operator, generally indicates whether or not the receiver is in the "in track" status.

Referring back again to the box 118 indicating the operation "decrement validity counter", there is preferably provided a timer 119 which provides validity counter decrement pulses at timed intervals. Thus, in circumstances where valid signals are received with insufficient frequency, the timer 119 will operate to decrement the validity counter, even in the absence of invalid (out of track) signals, so as to bring the validity count below the minimum value required for maintenance of the "in track" status. Thus, the "in track" status will be dropped.

If the system is not in the "track" mode, it must operate in a signal acquisition mode. This operation is determined, in terms of the logic flow chart, by the test previously described back at block 98. Thus, if the result of the test at 98 is "No", indicating that the receiver is not "in track", that information appears at 128, and then the track gates are set to a wide aperture, as indicated at 138, the scan angle within the sector is decoded, as indicated at 140, the sector angle is added to the scan angle, as indicated at 142, and then the resultant sum, which is the absolute relative bearing angle measurement, is averaged with previous angle measurements as indicated at 144. The number of samples entering into the average, and the average value, are stored, as indicated at 146. Next a decision is made as to whether a sufficient number of signals have been received within a prescribed time interval to accumulate an acceptable average angle value, as indicated at 146. This test is carried out on the basis of the recorded number of previously received signals which have been averaged, as indicated by connection 162 from box 146. If the answer is "No", the "not in track" status is maintained, as indicated at 148, and information is supplied, as indicated at 114 to ready the system, at 86, for the next information.

If the average is determined to be valid, as indicated by a "Yes" answer at connection 152, then the "in track" flag is set, as indicated at 154, and the ready information is again sent on connection 114 to ready box 86. The output information from box 144 also serves to reset a timer 158. If the valid average condition is not updated with sufficient frequency by information from box 144, the timer 158 times out, and through a connection 160, causes the previously stored average to be dumped from storage. The system must then begin a new attempt to build up a valid average.

Upon the setting of the "in track" status, as indicated at box 154, the validity counter is set to a predetermined initial value above the minimum value. This is indicated by the dotted connection 156 from box 154 to box 120.

Referring again to FIG. 1, one of the important advantages of the invention is that there is inherently provided multi-path discrimination in the signals because of the feature that the center of mechanical rotation of the antenna array is different from the apparent center of radiation 37 (the apparent center of the scan of the scanning beam signal). The term "multipath", as used in the above statement, refers particularly to signals which may be reflected from other fixed or movable objects near the transmitter, and which create additional signal paths for the transmitted signals to the receiver, with the possible effect of confusing the receiver as to the correct directional information imparted by the signals. The multipath discrimination arising from the lack of concentricity of the mechanical rotation and the center of radiation arises from the space diversity effect (also sometimes referred to as a motion averaging effect) which has the result of reducing the amplitude of any spurious multipath signals arising from any one signal reflective object, or any other one cause of multipath signals.

Multipath problems also may be dealt with in the present invention by employing the principles taught in a prior patent application Ser. No. 668,696 filed Mar. 19, 1976 by Donald J. Toman for RADIO NAVIGATION WITH SEPARATE CORRELATED SCANS TO AVOID REFLECTION INTERFERENCE, now U.S. Pat. No. 4,041,492, and assigned to the same assignee as the present application. That invention involves the principle of employing a main scan and an auxiliary scan, with the main scan preferably being blanked out in a small sector containing a permanent reflective obstruction. When applied to the system of the present invention, the blanking occurs in a particular sector having a permanent obstruction, and an auxiliary scan is provided to cover the portion of that sector which is blanked out on the regular sectors scan.

As mentioned above, one of the most important features of the invention is in the ability of the system to permit the aircraft which is being guided to fly from one sector to another without losing "track", and while continuously receiving guidance signals. This is made possible, in part, by the substantial overlap between the sector scan signals of adjacent sectors. Thus, in the example given earlier in connection with FIG. 2, the individual sectors may be, for instance, 22½ degrees in angular width, whereas the individual sector scans may be in the order of 36° in width. Thus, there may be as much as 13½° of overlap of adjacent sector scans.

As a specific example of what this overlap means, particularly in relation to the operation of the receiver, suppose the aircraft, with its receiver, is located at the boundary between sector 2 and sector 3 in FIG. 2. This corresponds to a true bearing of 45° with respect to the transmitter, assuming that the boundary between sectors 1 and 16 represents a true bearing of true North. Assuming a sector scan in sector 2, and referring back to FIG. 4, at box 96, the sector angle will be decoded as the center line angle for sector 2, which is 33¾°. Later, when the scan angle is decoded at 104, that scan angle is detected as 11¼°. When those two angles are added at 108, the resultant output angle, the true bearing, is correctly 45°. Then, if sector 3 is next scanned, the characteristic sector angle for sector 3 is decoded at 96 as the sector 3 center line bearing angle which is 56¼°. Later, when the scan angle is decoded at box 104, that scan angle is minus 11¼°. Thus, when the two angles are added at box 108, the correct output angle (true bearing) is again available at 112 which is 45°. Thus, the sector signals for both of the adjacent sectors are available to provide a true bearing output. Furthermore, since the true bearing output is available at 103 for determining the setting of the track gates, the track gates are correctly adjusted for either sector by subtracting the correct sector angle at box 109. Thus, whether the aircraft receiver remains on the 45° true bearing, or whether it flies away from the 45° bearing towards the center of either sector 2 or sector 3, there is a continuity in tracking, and directional bearing information is continuously available to the operator of the aircraft.

Thus far, the invention has been described in terms of an implementation with "to and fro" scanning. However, the principles of the invention are also applicable to other scanning methods. For instance, the scanning of individual sectors may be accomplished by means of a so-called Doppler system as illustrated, for instance, in FIG. 5 of the drawings.

Figure 5:
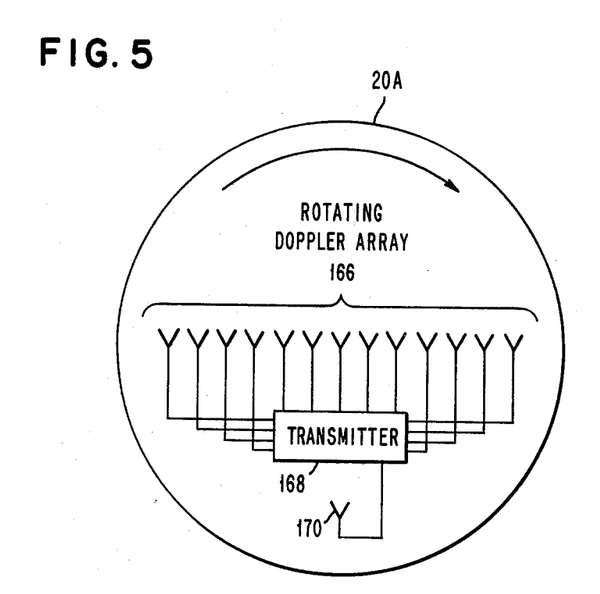
FIG. 5 is a schematic representation of an alternative embodiment of the transmitter and antenna arrangement which is employed for scanning signals using Doppler principles.

FIG. 5 is a simplified representation of a Doppler system for carrying out the present invention in which a rotating platform 20A is provided to rotate a Doppler antenna array 166 with its associated transmitter 168 through different sectors. This Doppler system may operate in a conventional Doppler mode in which transmitted signal radiations are switched in sequence from one radiation element to another and from one end of the array to another to create what appears to be a radiation signal from a source which is moving along the line of the array. A properly equipped receiver can then determine its bearing with respect to the line of the array based upon the apparent frequency shift due to the apparent movement of the source of the radiation along the line of the array. A separate antenna element, such as the element illustrated at 170, is provided for the purpose of issuing a standard frequency signal which has no apparent motion and which serves as a standard for determination of the frequency shift due to the apparent motion of the signal from the array 166. Element 170 is preferably located at the center of mechanical rotation of platform 20A, but is not shown in that position in order to promote clarity.

Insofar as applicable, all of the features described above in connection with the embodiment of FIGS. 1-4 are employed in this alternative Doppler embodiment of FIG. 5. Thus the system and the signal format are directly analogous to those used in the embodiment of FIGS. 1-4, with the exception that the scanning for each sector is carried out by the Doppler principle rather than by the "to and fro" principle.

As illustrated schematically in the drawing, the standard frequency radiating element 170 and the individual elements of the Doppler array 166 are horns, or other directional radiating elements, to generally confine the radiations to the individual sector which is being served.

Navigation systems employing the Doppler system are well known, and accordingly, it is not believed to be necessary to further spell out the details of the embodiment of FIG. 5. Furthermore, the details of the Doppler embodiment of FIG. 5 may be carried out in a manner consistent with, and compatible with, a proposal entitled "DOPPLER MICROWAVE LANDING GUIDANCE SYSTEM FOR A NEW NON-VISUAL PRECISION APPROACH AND LANDING GUIDANCE SYSTEM" submitted by the United Kingdom to the International Civil Aviation Organization in November 1975.

As mentioned above, all of the details of the embodiment of FIG. 5 which are applicable may be carried out in accordance with the teachings of the embodiment of FIGS. 1-4. For instance, detection of rotation of the platform 20A from one sector to another may be accomplished by means of a photoelectric pickup carried by the platform which detects different positions from a stationary optical track, as illustrated in FIG. 1. Furthermore, the Doppler signals may be monitored by a monitor receiver which is located to pick up the scanning signals within one predetermined sector.

In accordance with one of the features of the present invention, where a serious multipath signal problem is present in a particular sector on a permanent or frequent basis, and where it is not essential to have guidance signals within that sector, the regular guidance signals to that sector may be blanked out, and a special data message may be incorporated in the preamble of a set of signal information which is sent out instead of the guidance signals telling the aircraft receiver that this is a blanked sector. A second flag may be provided in the visual angle indicator 68 of FIG. 3 (not shown) to signal the operator of the aircraft that the aircarft is in a sector corresponding to a blanked signal. The aircraft operator will then know that he should change course to a new bearing, to fly into a sector where correct azimuth information is available. This sector blanking arrangement for avoiding multipath problems is particularly applicable to the Doppler system.

While the disclosure of the embodiments of FIGS. 1 and 5 refers to a rotating platform 20 or 20A as a part of the physical structure, it is to be understood that the platform need not necessarily constitute a disc-like element. Thus, it may be a completely open framework for rigidly supporting the rotating components in an arrangement such as could be provided by a solid platform, but without the need for providing a continuous flat circular platform surface.

The description of the invention given above has been entirely in terms of providing azimuth guidance signals for an aircraft with respect to a ground station. However, it is obvious that the invention is also useful for the purpose of providing elevation signals by using a platform for support of the antenna which rotatoes on a horizontal axis, and by providing sector scans generally about that horizontal axis. In such an arrangement, since elevations only above the horizon are generally required, 180° of total angular coverage will generally be the maximum required.

In the foregoing description, the angular position determined by the system is generally described as a "bearing angle". However, when used for elevation, this angle will generally be referred to simply as "elevation", or as the "elevation angle". In the material which follows, these angles are generically referred to as simply the "angular position".

Figure 6:
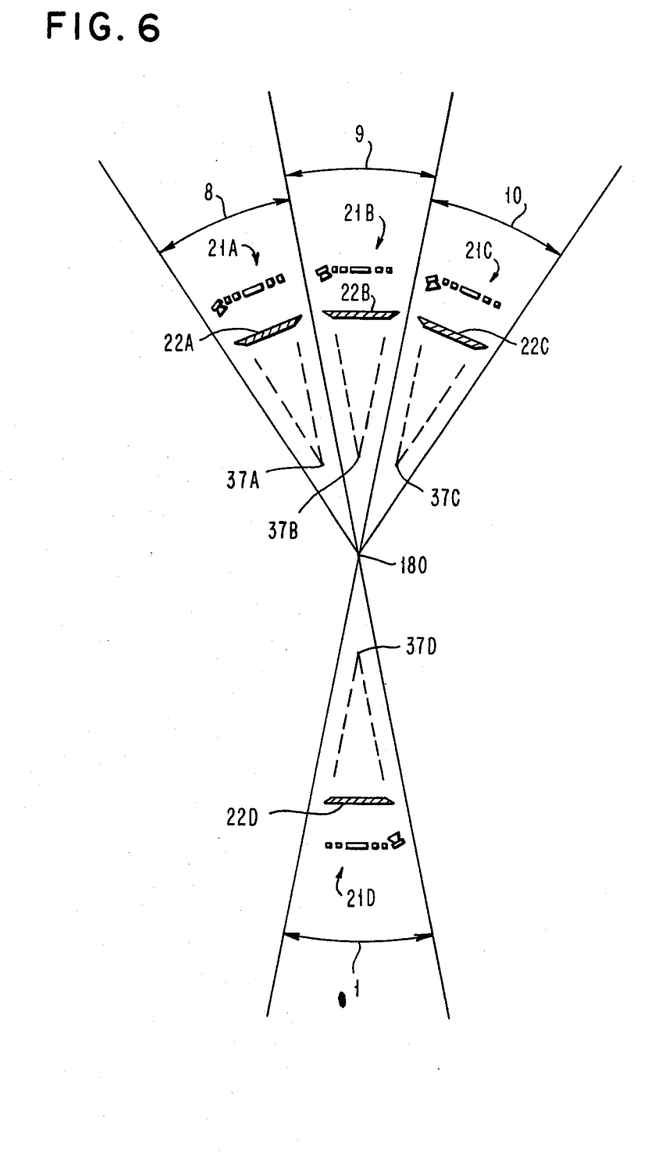
FIG. 6 is a reduced scale representation corresponding to the representation of FIG. 2, and illustrating two modified principles including the selection of only a limited number of sectors to be scanned, and the use of separate fixed antenna arrays for each sector instead of a single array on a rotatable platform.

The foregoing description is generally directed to providing a wide angle sector coverage which may include the entire 360° azimuth. However, it is obvious that the system also may be advantageously employed for coverage of any selected combination of sectors. As previously mentioned above, when used for elevation, sectors may be selected which cover only the 180° above the horizon. Similarly, when used in azimuth, the system need not necessarily cover the entire 360° azimuth. Referring back to FIG. 2, for instance, only sectors 1, 8, 9, and 10 might be selected to provide a wide angle front course guidance with the combination of sectors 8, 9, and 10, and to provide a narrower back course guidance with sector 1 for landings on a particular runway and in a particular direction. This particular selection of sectors is illustrated in FIG. 6. The advantage of such a combination of selected sectors is obvious. Thus, guidance may be provided in the exact sectors where it is required and needed, and cycle time need not be used for other sectors which are not needed.

While the back course sector 1 illustrated in FIG. 6 is directly opposite to the center sector 9 of the forward course, it is obvious that, in a special situation where natural obstructions or other factors may dictate a back course which is at somewhat of an angle to the forward course, a back course sector may be selected which is tilted to that required angle.

FIG. 6 also illustrates another aspect of the present invention in which there may be full electronic scan, without mechanical rotation. Thus, in each sector in which signals are required, a separate antenna array 21A–21D is provided in a fixed position corresponding to the sector which is to be served by that antenna array. Each antenna array is similar to the antenna array previously described in connection with FIG. 1, with the exception that it is fixed, rather than being mounted upon a rotatable platform. Each array preferably includes a reflector corresponding to the reflector 22 of FIG. 1. These are indicated respectively at 22A–22D. Thus, each array provides sector signals which are electronically scanned, and which are switched on in the desired sector scan sequence.

As illustrated in the drawing, the sectors 1 and 8–10 have a common center axis indicated at 180. The individual sector antenna arrays 21A–21D are preferably each designed to have an apparent center of radiation of the phase scanned beam which is somewhat offset from the common axis 180. These offset positions are indicated at 37A–37D. This offset provides a space diversity effect which reduces multi-path interference, as previously explained with respect to the apparent center of radiation 37 in connection with the embodiment of FIG. 1.

In the embodiment of FIG. 6, it is important that the various individual antenna arrays 21A–21D should be carefully matched to one another so that the signals radiated by the different sectors have similar characteristics.

While the embodiment of FIG. 6, with separate fixed antenna arrays, does not have some of the advantages of the previously described embodiment with a single array and a rotating platform, there are some common advantages such as, for instance, the previously discussed advantages of the requirement of an omni-beam which only covers a single sector at a time. There are also unique advantages to the fixed separate array arrangement of FIG. 6. Thus, the problems associated with providing a mechanically rotatable platform are avoided.

It is obvious that the signals from the separate fixed arrays of FIG. 6 may be received and processed by the aircraft receiver in exactly the same manner as the signals provided from the previously described signal antenna array on a rotating platform. Thus, the signal format of the signals provided from the separate fixed arrays will be substantially identical to that provided from the previously described single array on a rotating platform.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

I claim:

1. A method of providing accurate directional information to an aircraft in any angular position about a predetermined axis over a wide angle sector with respect to a ground station comprising
transmitting radio guidance signals in a sequence of separate electrically scanned sector signals in limited angle sectors within said wide angle sector,
transmitting radio signals in conjunction with each of said separate electrically scanned sector signals to uniquely identify the particular sector,
the number of said separate sectors at which electrically scanned sector signals are emitted being sufficient to cover all angular positions within said wide angle sector by the combination of all of the separate electrically scanned sector signals,
said radio signals transmitted in conjunction with each of said electrically scanned sector signals to uniquely identify the rotational position of said antenna array being transmitted prior to the transmission of the associated electrically scanned sector signals as a part of an information preamble to the sector signals,
the information preamble also including other identifying data distinguishing the wide angle sector angular position function from other functions for which similar signals are transmitted.

2. A method as claimed in claim 1 wherein
said predetermined axis is a horizontal axis and said angular positions are elevation angles.

3. A method as claimed in claim 1 wherein
said predetermined axis is a vertical axis and said angular positions are azimuth angles.

4. A method as claimed in claim 3 wherein
said wide angle sector encompasses the entire 360° azimuth.

5. A method as claimed in claim 1 wherein
said separate electrically scanned sector signals are produced by separate fixed antenna arrays for each sector.

6. A method as claimed in claim 1 wherein
the information preamble is transmitted by binary digital coding of the carrier signal.

7. A method of providing accurate directional information to an aircraft in any angular position about a predetermined axis over a wide angle sector with respect to a ground station comprising
transmitting radio guidance signals in a sequence of separate electrically scanned sector signals in limited angle sectors within said wide angle sector,
transmitting radio signals in conjunction with each of said separate electrically scanned sector signals to uniquely identify the particular sector, the number of said separate sectors at which electrically scanned sector signals are emitted being sufficient to cover all angular positions within said wide angle sector by the combination of all of the separate electrically scanned sector signals, and transmitting additional radio signal energy in clearance beams and in side lobe suppression signals in order to enable the receiver to discriminate between valid sector signals for the sector in which the receiver is positioned and sector signals radiated for other sectors.

8. A method as claimed in claim 1 wherein the scanned sector signals are each emitted as a time reference scan group including a "to" scan and a "fro" scan with the angular position of the receiver being determined on the basis of the time interval between reception of the "to" scan and "fro" scan signals.

9. A method of providing accurate directional information to an aircraft in any angular position about a predetermined axis over a wide angle sector with respect to a ground station comprising transmitting radio guidance signals in a sequence of separate electrically scanned sector signals in limited angle sectors within said wide angle sector, transmitting radio signals in conjunction with each of said separate electrically scanned sector signals to uniquely identify the particular sector, the number of said separate sectors at which electrically scanned sector signals are emitted being sufficient to cover all angular positions within said wide angle sector by the combination of all of the separate electrically scanned sector signals, the electrically scanned sector signals being scanned by the Doppler method wherein the radiated signal is switched in sequence from one end to the other of an array of radiating elements to convey the impression of radiation from a moving source which moves from one end to the other of the array, and which creates a frequency shift in a receiver dependent upon the orientation of the receiver with respect to the array.

10. A method as claimed in claim 1 wherein the electrically scanned sector signals are blanked out in at least one of the rotational position sectors in order to avoid multipath signal problems arising in that particular sector.

11. A method of providing accurate directional information to an aircraft in any angular position about a predetermined axis over a wide angle sector with respect to a ground station comprising transmitting radio guidance signals in a sequence of separate electrically scanned sector signals in limited angle sectors within said wide angle sector, transmitting radio signals in conjunction with each of said separate electrically scanned sector signals to uniquely identify the particular sector, the number of said separate sectors at which electrically scanned sector signals are emitted being sufficient to cover all angular positions within said wide angle sector by the combination of all of the separate electrically scanned sector signals, receiving said directional radio guidance signals with a receiver in an aircraft to be guided, storing the true angular position of the receiver relative to the ground station as indicated by at least the last previous radio guidance signal, and processing the next subsequent guidance signal by decoding the sector identification information associated with that guidance signal, subtracting the characteristic sector angle associated with the identified sector from said stored true relative angular position and using the difference to set angle limit track gates indicating the angle limits within which a valid sector scan signal should appear within the identified sector, then using said track gate limits to confirm the validity of the subsequent sector scan signal indicating the angle within the identified sector, and then adding to the confirmed sector scan signal the characteristic sector angle of the identified sector to provide the true relative angular position as an output to the operator.

12. A method of providing accurate directional information to an aircraft in any angular position about a predetermined axis over a wide angle sector with respect to a ground station comprising transmitting radio guidance signals in a sequence of separate electrically scanned sector signals in limited angle sectors within said wide angle sector, transmitting radio signals in conjunction with each of said separate electrically scanned sector signals to uniquely identify the particular sector, the number of said separate sectors at which electrically scanned sector signals are emitted being sufficient to cover all angular positions within said wide angle sector by the combination of all of the separate electrically scanned sector signals, receiving said directional radio guidance signals with a receiver in an aircraft to be guided, storing the true angular position of the receiver relative to the ground station as indicated by each of a representative plurality of said signals received in sequence, computing an average value of said true relative angular positions, setting said receiver into a track mode, then processing the first subsequent guidance signal by decoding the sector identification information, subtracting the characteristic sector angle associated with the identified sector from said average value and using the difference to set angle limit track gates indicating the angle limits within which a valid sector scan signal should appear within the identified sector, then using said track gate limits to confirm the validity of the subsequent sector scan signal indicating the angular position within the identified sector, and then adding to the confirmed sector scan signal and characteristic sector angle of the identified sector to provide the true relative angular position as an output to the operator.

13. A method as claimed in claim 12 wherein second and later subsequent guidance signals are processed by storing the last previous true relative angular position output and using that stored output in substitution for said average value in setting the angle limit track gate after subtracting the characteristic sector angle of the identified sector.

14. A method of providing accurate directional information to an aircraft in any angular position about a predetermined axis over a wide angle sector with respect to a ground station comprising transmitting radio guidance signals in a sequence of separate electrically scanned sector signals in limited angle sectors within said wide angle sector, transmitting radio signals in conjunction with each of said separate electrically scanned sector signals to uniquely identify the particular sector, the number of said separate sectors at which electrically scanned sector signals are emitted being sufficient to cover all angular positions within said wide angle sector by the combination of all of the separate electrically scanned sector signals, and providing directional information in at least one selected sector in addition to said wide angle sector by means of at least one additional separate electrically scanned sector signal.

15. A method as claimed in claim 14 wherein said predetermined axis is vertical and said wide angle sector provides forward azimuth course guidance and said additional selected sector provides back azimuth course guidance.

16. A method of providing accurate directional information to an aircraft in any angular position about a predetermined axis over a wide angle sector with respect to a ground station comprising transmitting radio guidance signals in a sequence of separate electrically scanned sector signals in limited angle sectors within said wide angle sector, transmitting radio signals in conjunction with each of said separate electrically scanned sector signals to uniquely identify the particular sector, the number of said separate sectors at which electrically scanned sector signals are emitted being sufficient to cover all angular positions within said wide angle sector by the combination of all of the separate electrically scanned sector signals, mechanically rotating about said predetermined axis a ground station transmitter antenna array which is capable of producing directional radio guidance signals by an electrical scan through only one of said limited angle sectors for each rotational position thereof, and transmitting from the antenna array said sequence of separate electrically scanned sector signals during successive mechanical rotation through a plurality of separate rotational positions, the identification radio signals transmitted in conjunction with each of said electrically scanned sector signals being operable to uniquely identify the rotational position of said antenna array corresponding to a particular sector.

17. A method as claimed in claim 16 wherein the scanned sector signals are each emitted as a time reference scan group including a "to" scan and a "fro" scan, with the angular position of the receiver being determined on the basis of the time interval between reception of the "to" scan and "fro" scan signals.

18. A method as claimed in claim 17 wherein the electrical scanning of the sector signals is carried out in a substantially circular sector and in which the effective axis of the electrical scan is displaced from the axis of mechanical rotation of the antenna array in order to provide for multipath discimination as the signals are received.

19. A method as claimed in claim 17 wherein the electrical scanning rates of the "to" and "fro" scans are different to provide rotational scan rate compensation for the mechanical rotation of the antenna array so as to provide "to" and "fro" scans having the same absolute rate of rotation in the two different scan directions.

20. A method as claimed in claim 19 wherein the "to" and "fro" scans are position compensated so that the angles at which the electrical scans respectively for "to" and "fro" are commenced at different angles with respect to the rotating antenna array in order to compensate for the mechanical displacement of the mechanically rotating antenna array in the interval between the commencement of the "to" scan and the commencement of the "fro" scan.

21. A method as claimed in claim 16 wherein the scanned sector signals are monitored by a fixed monitor receiver which is arranged to receive scanned sector signals in only one of the antenna sectors.

22. Radio guidance apparatus for providing accurate orientation information to an aircraft in any angular position over a wide angle sector with respect to a predetermined axis at a ground station comprising a ground station including a transmitter and an associated antenna array which is capable of producing directional radio guidance signals by an electrical scan through only a limited angle sector, platform means for supporting and mechanically rotating said antenna array about said predetermined axis to thereby change the orientation of said antenna array, said ground station being capable of transmitting radio guidance signals from said antenna array in a sequence of separate electrically scanned sector signals during successive mechanical rotation through a plurality of different rotational positions, the number of said different rotational positions at which electrically scanned sector signals are emitted being sufficient to cover all angles within said wide angle sector by the combination of all of the electrically scanned sector signals, said apparatus including means for transmitting radio signals in conjunction with each of said electrically scanned sector signals to uniquely identify the rotational position of said antenna array corresponding to a particular sector.

23. Apparatus as claimed in claim 22 wherein all of the directions about said axis are divided into a predetermined number of fixed sectors having predetermined sector width, and wherein there is provided a means for detecting the rotation of said antenna array through said different sectors, said transmitter being connected to said last-named means and being operable in response to detection of the rotation of said antenna array from one sector to another to initiate a sector scan signal for the new sector.

24. Apparatus as claimed in claim 23 wherein said transmitter is rotatable with said antenna array, and wherein said means for detecting the rotation of said antenna array from one sector to another comprises a photo responsive pick-up means rotatable with said transmitter and said antenna array and a cooperating fixed optical track having optical characteristics which are different at different sectors.

25. Apparatus as claimed in claim 22 wherein there is provided a monitor receiver apparatus to receive and monitor the sector scan signals in at least one predetermined sector to thereby monitor the accuracy of the sector scan, and switching means operable for detection of the rotation of said antenna array into the monitored sector for activating said monitor apparatus.

26. Apparatus as claimed in claim 25 wherein said monitor apparatus includes a plurality of receiver antennas positioned at different angles within the monitored sector for accurately monitoring the sector scan signals within the entire sector.

27. Apparatus as claimed in claim 22 wherein said transmitter and said antenna array are operable to produce the electrical scan through the limited angle sector by scanning a beam of energy to and fro so that the receiver can detect position by measuring the interval between the reception of the respective to and fro scan signals.

28. Apparatus as claimed in claim 22 wherein said antenna array is a straight line Doppler array which is operable to provide the sector scan signal by the Doppler principle.

29. An aircraft receiver apparatus for receiving directional radio guidance signals including a sector scan signal in each of a series of different narrow angular sectors about a predetermined axis at a ground station from which the signals are transmitted and in which the sectors together may cover all possible angular positions of said aircraft about said axis to provide signals giving the true angular position to the aircraft carrying the receiver, each sector scan signal including sector identification information, said receiver including means for storing the true angular position of the receiver relative to the ground station as indicated by at least the last previous radio guidance signal, means for processing the next subsequent guidance signal by decoding the sector identification information associated with that guidance signal, means for subtracting a characteristic sector angle associated with the identified sector from said stored true angular position, angle limit track gates and means for employing the difference to set said angle limit track gates to indicate the angle limits within which a valid sector scan signal should appear within the identified sector, and means for adding the characteristic sector angle of the identified sector to a sector scan signal which is confirmed as valid by said track gates to thereby provide the true angular position as an output, and indicating means connected to receive said true angular position for display.

30. An aircraft receiver as claimed in claim 29 wherein said storing means for said true angular position comprises means for storing the true angular position of the receiver relative to the ground station as indicated by each of a representative plurality of sector scan signals received in sequence and means for computing an average value of said true relative angular positions, said storing means being operable for storing said average value for use as said stored true angular position for setting said angle limit track gates.

31. A method as claimed in claim 1 wherein said rotational position identification signals are transmitted over a limited sector generally corresponding to the sector covered by the sector signals.

* * * * *

UNITED STATES PATENT AND TRADEMARK OFFICE
CERTIFICATE OF CORRECTION

PATENT NO. : 4,080,600
DATED : March 21, 1978
INVENTOR(S) : Donald J. Toman

It is certified that error appears in the above-identified patent and that said Letters Patent are hereby corrected as shown below:

Column 5, line 14, "91/6" should read --9-1/6--.

Column 6, line 52, "detector" should read --decoder--.

Column 9, line 1, "maintaning" should read --maintaining--.

Column 10, line 22, "the" before "space" should read --a--;
          line 43, "sectors" should read --sector--.

Column 12, line 30, "aircarft" should read --aircraft--;
          line 51, "rotatoes" should read --rotates--.

Column 16, line 53, "and" should read --the--.

Signed and Sealed this

Eighteenth Day of July 1978

[SEAL]

Attest:

RUTH C. MASON
Attesting Officer

DONALD W. BANNER
Commissioner of Patents and Trademarks